United States Patent
Wang (10) Patent No.: US 10,754,767 B2
(45) Date of Patent: Aug. 25, 2020

(54) METHOD AND APPARATUS FOR LOADING A RESOURCE IN A WEB PAGE ON A DEVICE

(71) Applicant: GUANGZHOU UCWEB COMPUTER TECHNOLOGY CO., LTD., Guangzhou, Guangdong (CN)

(72) Inventor: Xiaozhen Wang, Guangzhou (CN)

(73) Assignee: Guangzhou UCWeb Computer Technology Co., Ltd., Guangzhou, Guangdong (CN)

( * ) Notice: Subject to any disclaimer, the term of this patent is extended or adjusted under 35 U.S.C. 154(b) by 293 days.

(21) Appl. No.: 15/442,489

(22) Filed: Feb. 24, 2017

(65) Prior Publication Data
US 2017/0168927 A1    Jun. 15, 2017

Related U.S. Application Data (63) Continuation of application No. PCT/CN2015/079258, filed on May 19, 2015.

(51) Int. Cl.
*G06F 12/02* (2006.01)
*G06F 16/958* (2019.01)
(Continued)

(52) U.S. Cl.
CPC .......... *G06F 12/023* (2013.01); *G06F 16/958* (2019.01); *G06F 16/9574* (2019.01);
(Continued)

(58) Field of Classification Search
CPC ............ G06F 12/023; G06F 17/30902; G06F 17/3089; G06F 17/30905; G06F 2212/1044; G06F 16/9577; H04L 67/02
See application file for complete search history.

(56) References Cited

U.S. PATENT DOCUMENTS

| 5,918,229 A | 6/1999 | Davis et al. |
| 5,987,506 A | 11/1999 | Carter et al. |

(Continued)

FOREIGN PATENT DOCUMENTS

| CN | 103544207 A | 1/2014 |
| CN | 103677942 A | 3/2014 |

(Continued)

OTHER PUBLICATIONS

International Search Report and Written Opinion for Application No. PCT/CN2015/079258, dated Feb. 5, 2016, 6 pages.

*Primary Examiner* — Caroline H Jahnige
(74) *Attorney, Agent, or Firm* — Sheppard Mullin Richter & Hampton LLP (57) ABSTRACT

The present disclosure discloses a method and an apparatus for loading a resource in a web page on a device as well as a computer-readable storage medium. Wherein, the method comprises: determining whether a current available memory level of the device is normal or low; loading the resource in the web page according to the current available memory level; wherein, if the current available memory level is low, loading the resource in the web page according to the current available memory level further comprises: loading a specified resource tailored from the resource in the web page. According to the embodiments of the present disclosure, lots of memory may be saved and the loading speed may be improved. Therefore the browser resided in the device may be prevented from being broken, and the user experiences may be improved.

13 Claims, 7 Drawing Sheets

(51) Int. Cl.
  *G06F 16/957* (2019.01)
  *H04L 29/08* (2006.01)
(52) U.S. Cl.
  CPC .......... *G06F 16/9577* (2019.01); *H04L 67/02* (2013.01); *G06F 2212/1044* (2013.01)

(56) References Cited

U.S. PATENT DOCUMENTS

| | | | |
|---|---|---|---|
| 6,026,474 | A | 2/2000 | Carter et al. |
| 6,343,350 | B1* | 1/2002 | LaMaire ............. G06F 16/9574 |
| | | | 711/156 |
| 6,754,699 | B2 | 6/2004 | Swildens et al. |
| 6,785,542 | B1 | 8/2004 | Blight et al. |
| 7,562,149 | B2 | 7/2009 | Teodosiu et al. |
| 7,873,710 | B2 | 1/2011 | Kiley et al. |
| 8,355,407 | B2 | 1/2013 | Wookey et al. |
| 8,429,630 | B2 | 4/2013 | Nickolov et al. |
| 8,504,775 | B2 | 8/2013 | Plamondon |
| 8,549,096 | B2 | 10/2013 | Gulley et al. |
| 8,639,260 | B2 | 1/2014 | Fox et al. |
| 8,849,761 | B2 | 9/2014 | Prahlad et al. |
| 8,868,467 | B2 | 10/2014 | Serebrennikov |
| 8,996,891 | B2 | 3/2015 | Tabone et al. |
| 2005/0138140 | A1* | 6/2005 | Wen ..................... G06F 16/9574 |
| | | | 709/217 |
| 2007/0207794 | A1* | 9/2007 | Dunko ................... H04W 8/22 |
| | | | 455/419 |
| 2008/0018660 | A1* | 1/2008 | Nenonen ............... G06T 3/0012 |
| | | | 345/596 |
| 2011/0087776 | A1* | 4/2011 | Tabone ............. G06F 17/30097 |
| | | | 709/224 |
| 2014/0095583 | A1* | 4/2014 | Houle ............... G06F 17/30905 |
| | | | 709/203 |
| 2014/0122995 | A1* | 5/2014 | Beckmann .......... G06F 17/3089 |
| | | | 715/234 |
| 2015/0095408 | A1* | 4/2015 | Wang ................. G06Q 30/0271 |
| | | | 709/203 |
| 2015/0149514 | A1* | 5/2015 | Kim ................. G06F 17/30339 |
| | | | 707/812 |

FOREIGN PATENT DOCUMENTS

| | | |
|---|---|---|
| CN | 103984781 A * | 8/2014 |
| CN | 103984781 A | 8/2014 |
| WO | 2013/028019 A2 | 2/2013 |

* cited by examiner

METHOD AND APPARATUS FOR LOADING A RESOURCE IN A WEB PAGE ON A DEVICE

CROSS-REFERENCE TO RELATED APPLICATION

This application is a continuation application of International Application No. PCT/CN2015/079258, filed on May 19, 2015, the entire content of which is incorporated herein by reference.

FIELD

The present invention relates to the technical field of web page design, and in particular, relates to a method and an apparatus for loading a resource in a web page on a device.

BACKGROUND

With the development of technologies of computer and networks, people's way of life has been changed a lot. More and more people browse internet through various devices such as desktop computers, smart phones, tablets and so on daily. Browsers which reside in devices can load resources in web pages on screens of the devices. People may browse the loaded resources on the screens of the devices. The speeds of loading resources have great effects on user's experiences on internet.

Resources in web pages at least include pictures, audio information, video information and so on. There are several factors which may affect the speeds of loading resources in web pages on the devices: for example, the sizes of the loaded resources, available memory size of the device, the characteristics of the devices such as resolution, and so on.

Recently, improving loading speeds of resources in web pages on devices is desired.

SUMMARY

The embodiments of the invention provide a method and an apparatus for loading a resource in a web page on a device, thereby solving the above-mentioned problems in the prior art.

In order to solve the above technical problems, a computer-readable storage medium is also provided.

In an embodiment of the present disclosure, it is provided a method for loading a resource in a web page on a device which may include the following technical features:
  determining whether a current available memory level of the device is normal or low;
  loading the resource in the web page according to the current available memory level;
  wherein, if the current available memory level is low, loading the resource in the web page according to the current available memory level further comprises: loading a specified resource tailored from the resource in the web page.

Further, if the current available memory level is normal, loading the resource in the web page according to the current available memory level further comprises: loading the resource in the web page on the device according to characteristics of the device.

Further, the loading the resource in the web page according to the current available memory level further comprises: if the current available memory level is low and there is a normally loaded resource in the web page, releasing memory taken by the normally loaded resource and reloading the specified resource in the web page on the device.

Furthermore, the resource includes pictures, audio information or video information.

In addition, according to an embodiment of the present disclosure, loading the resource in the web page according to the current available memory level further comprises: if the current available memory level is normal, loading the resource in the web page on the device according to a resolution of the device.

In an embodiment of the present disclosure, wherein, the determining whether a current available memory level of the device is normal or low further comprises:
  obtaining system service information of an operating system running on the device;
  obtaining available memory size according to the system service information;
  determining the current available memory level to be low if the available memory size is less than a threshold; or
  determining the current available memory level to be normal if the available memory size is larger than the threshold.

Further, if the current available memory level is low, loading a specified resource tailored from the resource in the web page further comprises: obtaining information of the specified resource from a header of the resource.

In another embodiment of the present disclosure, an apparatus for loading a resource in a web page on a device is provided. The apparatus may comprise:
  a memory management module configured to determine whether a current available memory level of the device is normal or low;
  a loading module configured to load the resource in the web page on the device according to the current available memory level;
  wherein, if the current available memory level is low, then the loading module loads a specified resource tailored from the resource in the web page on the device.

Further, if the current available memory level is normal, then the loading module loads the resource in the web page on the device according to characteristics of the device.

Furthermore, the loading module is further configured to: release memory taken by a normally loaded resource and reload the specified resource in the web page on the device if the current available memory level is low and there is the normally loaded resource in the web page.

In addition, the loading module is configured to load the resource in the web page on the device according to a resolution of the device if the current available memory level is normal.

According to an embodiment of the present disclosure, the memory management module further comprises:
  system service information obtaining means configured to obtain system service information of an operating system running on the device;
  available memory size obtaining means configured to obtain available memory size according to the system service information;
  determination means configured to: determine that the current available memory level is low if the available memory size is less than a threshold; determine the current available memory level is normal if the available memory size is larger than the threshold.

Further, the loading module is further configured to obtain information of the specified resource from a header of the resource if the current available memory level is low.

In a yet embodiment of the present disclosure, a non-transitory computer-readable storage medium on which instructions are stored is provided, wherein, the instructions, when executed by a processor, cause the processor to perform the method as described above.

As compared with the prior art, the technical solutions according to embodiments of the present disclosure may load the resource in the web page on the device normally if the current available memory level of the device is normal. However, if the current available memory level of the device is low, the technical solutions according to embodiments of the present disclosure may load a specified resource which is tailored from the resource and takes less memory than the resource in the web page on the device. Thus, much memory may be saved and the loading speed may be improved. The browser resided in the device may be prevented from being broken, and the user experiences may be improved.

It is to be understood that the foregoing general description and the following detailed description are exemplary and explanatory only, and are not restrictive of the invention, as claimed.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will be made in detail to embodiments of the present disclosure. The embodiments described herein with reference to the accompany drawings are explanatory and illustrative, in which the same or similar reference numerals throughout signify the same or similar components or components having the same or similar functions. The embodiments are used to generally understand the present disclosure, and shall not be construed to limit the present disclosure.

Pictures are one kind of common resources in web pages,—and the ways of loading pictures in web pages on a device plays a critical role in improving user's experience on the Internet. A conventional method of responsive image is used to increase the speed of displaying pictures in web pages on screens of devices. According to the method of responsive image, browsers residing in a device may load different types of pictures based on the screen size of the device or the resolution of the device. Different devices may display pictures which are most suitable to the respective device.

Figure 1:
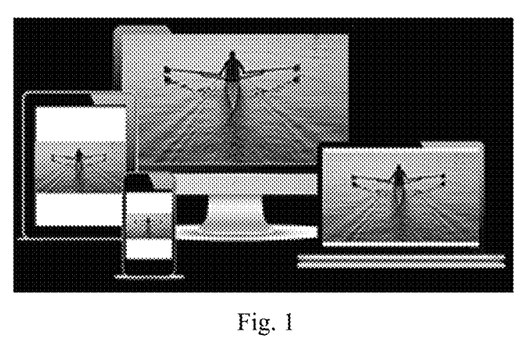
FIG. 1 shows effects of a picture displayed on different devices by a method which is not a method of responsive image.
Figure 2:
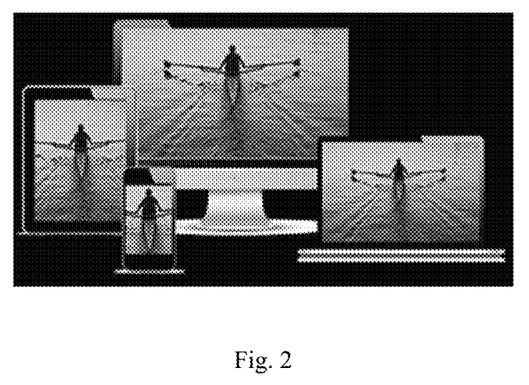
FIG. 2 shows effects of a picture displayed on different devices by a method of responsive image.

FIG. 1 shows effects of a picture displayed on different devices without using the method of responsive image. On the other hand, FIG. 2 shows effects of a picture displayed on different devices by the method of responsive image. It can be seen from FIG. 1 and FIG. 2, user's experiences on browsing web pages may be greatly improved by the method of responsive image.

Resources in web pages such as pictures, audio, video and so on may consume a massive amount of memory of the device while being loaded. In particular, in some cases, the size of a picture in a web page is even larger than the size of all text content of the whole web page. In addition, a massive amount of memory will also be consumed during the decoding of pictures. The loading of resources such as pictures in web page on the device sometimes fails as the device is in a low memory situation, i.e., the available memory level of the device is low. There might be several reasons which can cause the low memory situation: the memory capacity of the device is small; application programs being running on the device consume memory too much; or there are lots of opened web pages in browsers residing in the device, and so on. In the case that the device is in a low memory situation, picture loading in web page might fail, even sometimes the browser might be broken, which brings bad user experiences.

It is normal phenomenon for a device such as mobile phone and so on that the available memory level is low. According to embodiments of the present disclosure, the speed of loading resources in web pages to device can be accelerated, and user's experiences on browsing web pages may be improved, even when the available memory is low.

Figure 3:
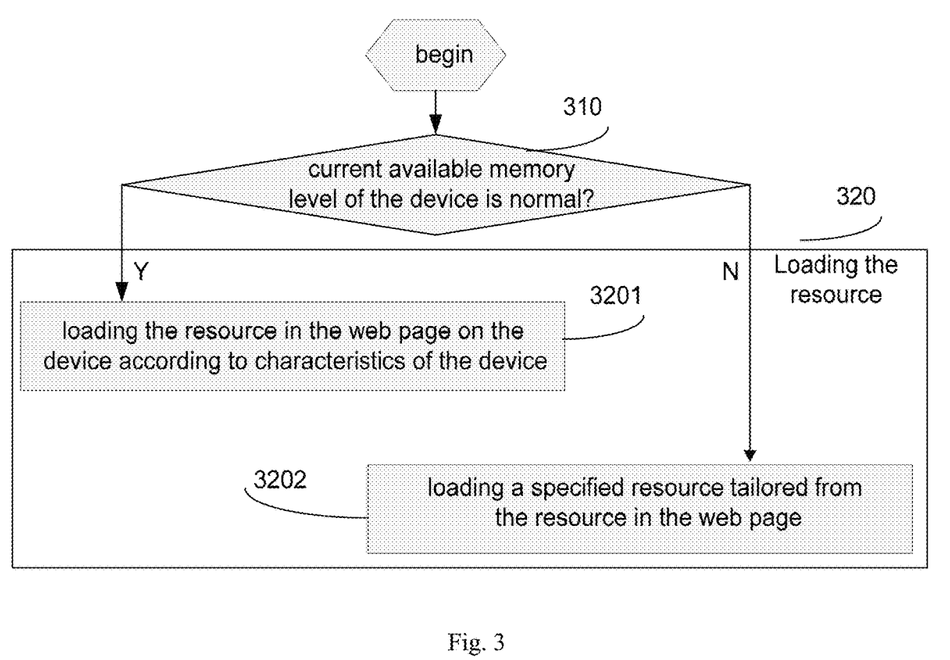
FIG. 3 is a flow chart of a method for loading a resource in a web page on a device according to an embodiment of the present disclosure.

FIG. 3 is a flow chart of a method for loading a resource in a web page on a device according to an embodiment of the present disclosure. Referring to FIG. 3, the method begins at step 310. At step 310, it is determined whether a current available memory level of the device is normal or low. After that, at step 320, the resource in the web page is loaded according to the current available memory level as determined at step 310. Specifically, if the current available memory level is low, step 3202 of loading a specified resource which is tailored from the resource for less memory usage than the original resource is performed in the web page on the device.

If the current available memory level is normal, then a conventional method may be implemented for further loading the resource. For example, step 3201 of loading the resource in the web page on the device according to characteristics of the device is performed.

In the embodiment of the present disclosure, when the current available memory level is normal, a resource can be loaded as normal. However, when the current available memory level is low, a specified resource which is tailored from the resource may be loaded to take less memory usage. Thus, according to the embodiment of the present disclosure, on one hand, the loading speed of resources in web pages to the device may be improved. On the other hand, the failure ratio of loading resources in web pages on the device may decrease.

In an embodiment of the present disclosure, if it is determined at step 310 that the current available memory level is low, and further it is determined that a resource is already normally loaded, for example another picture, is previously normally loaded, the step 320 of loading the resource in the web page according to the current available memory level may further comprise a step of releasing memory taken by the normally loaded resource and reloading a specified resource corresponding to the normally loaded resource to the device. In other words, in such case, after performing the step 310 and before performing the step 3202, the memory taken by the previously normally loaded resource is released. In this situation, specified resources of all the resources, including previously loaded resource and current resource, are used in the web page, Accordingly, it can ensure that there is more memory available in the device. In addition, the resource may include pictures, audio information or video information.

As described above, if the current available memory level is normal, then step 3201 of loading the resource in the web page on the device according to characteristics of the device is performed. For example, if the resource to be loaded is a picture, then a method according to an embodiment of the present disclosure may comprise a step of loading the picture to the device according to a screen resolution of the device. In such situation, the method corresponds to the above mentioned method of responsive image.

By using the method of responsive image, different devices may display pictures which are most suitable to the respective device. In other words, if a screen resolution of a device such as computer is high, then a high resolution image may be loaded onto the screen of the computer, and the computer may display the high resolution image. If a screen resolution of a device such as a mobile phone is low, then a low resolution image may be loaded onto the screen of the mobile phone, and the mobile phone may display the low resolution image.

In order to make the solution of the present disclosure better understood, a detailed embodiment of the present disclosure is described below.

Firstly, the conventional method of responsive image is described below.

A standard syntax in designing an HTML web page according to the conventional method of responsive image is as follows:

```
<picture>
<source srcset= " path1 resolution1, path2 resolution2, ... " >
</picture>
``` wherein, "resolution1" indicates the screen resolution of a device on which a picture is to be loaded; "path1" indicates a storage path of the picture which may be loaded in the web page on the device whose screen resolution corresponds to resolution1; "resolution2" indicates a screen resolution of the device on which a picture is to be loaded; "path2" indicates a storage path of the picture which may be loaded in the web page on the device whose screen resolution corresponds to resolution2. As mentioned above, in such conventional method, in the case that the device is in a low memory situation, picture loading in web page might fail, even sometimes the browser might be broken, which brings bad user experiences.

Thus, according to an embodiment of the present disclosure, an extended syntax in designing an HTML web page is as follows:

```
<picture>
<source srcset= " path1 resolution1, path2 resolution2, ... , path-low low-memory " >
<picture>
``` wherein, "low-memory" indicates that the current available memory level about a device on which a picture is to be loaded is low; "path-low" indicates a storage path of a picture which may be loaded in the web page on a device when the current available memory level of the device is low.

Taking a picture with width of 500 pixels and height of 500 pixels as an example, an instance based on above extended syntax is as follows:

```
<picture width="500" height="500">
<source srcset="large-1.png 1x, large-2.png 2x, small.png low-memory">
<picture>
```

In this example, "small.png" indicates the storage path of a picture which may be loaded in the web page on a device when the current available memory level of the device is low. When the current available memory level of the device is normal, large-1.png or large-2.png may be loaded in the web page on the device, which is the normal situation of the conventional method. Furthermore, if the screen resolution of the device corresponds to 1x (x represents screen resolution, for example), then large-1.png may be loaded in the web page on the device. If the screen resolution of the device corresponds to 2x, then large-2.png may be loaded in the web page on the device.

Figure 4:
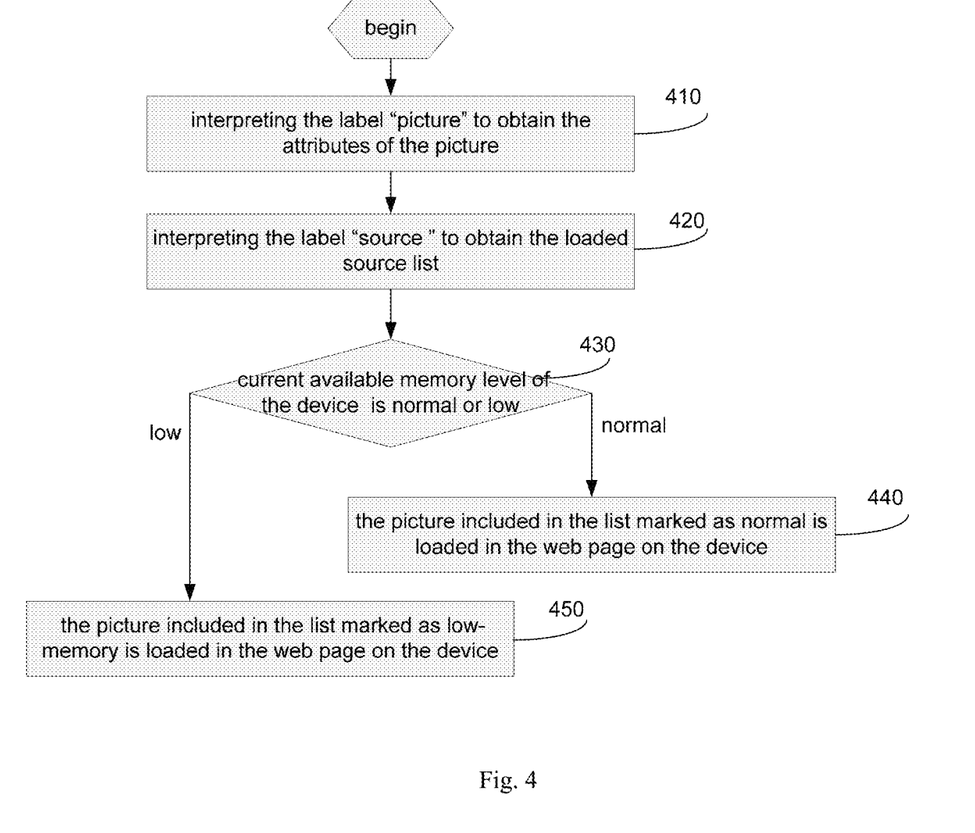
FIG. 4 is a flow chart of a method for processing the extended syntax according to an embodiment of the present disclosure.

FIG. 4 is a flow chart of a method for processing the aforementioned extended syntax according to an embodiment of the present disclosure. In FIG. 4, the method begins at step 410. At step 410, a label "picture" in an HTML code is interpreted by a browser to obtain attributes of the picture. For example, at step 410, the size attribute of the picture is obtained, such as width of 500 pixels and height of 500 pixels. And then, at step 420, a label "source" is interpreted by the browser to obtain a loaded source list. In one embodiment, there are two lists, one list is marked as "normal", the other list is marked as "low-memory". The list marked as "normal" includes two pictures, which are, large-1.png and large-2.png. According to an embodiment of the disclosure, all pictures included in the list marked as "normal" are marked as normal, and all pictures included in the list marked as "low-memory" are marked as low-memory. In this example, the list marked as "normal" includes two pictures, i.e., large-1.png and large-2.png, and the list marked as "low-memory" includes one picture, i.e., small.png. It should be understood that there may be more than two pictures or may be only one picture in the list marked as "normal" according to embodiments of the present disclosure. The number of pictures should not be limited to the number as described here.

According to an embodiment of the disclosure, every picture included in the list marked as "normal" corresponds to a property of the device. For example, large-1.png corresponds to the property of 1x; and large-2.png corresponds to the property of 2x. As described above, 1x and 2x may indicate the screen resolutions of the device.

At step 430, it is determined whether the current available memory level of the device on which the picture is to be loaded is low or normal. If the current available memory level is low, then the method proceeds to step 450. At step 450, the picture included in the list marked as "low-memory" is loaded in the web page on the device. If the current available memory level is normal, then the method proceeds to step 440. At step 440, the picture included in the list marked as "normal" is loaded in the web page on the device. For example, small.png can be loaded.

Normally, there are more than one pictures in the list marked as "normal", and which picture in the list marked as "normal" will be loaded depends on the characteristics of the device. For example, if the screen resolution of the device is 1x, then large-1.png may be loaded in the web page on the screen of the device. If the screen resolution of the device is 2x, then large-2.png may be loaded in the web page on the screen of the device.

It is noted that the size of small.png is smaller than the sizes of large-1.png and large-2.png in this example.

As described above, if the current available memory level of the device on which a picture is to be loaded is low, a smaller size picture may be loaded in the web page on the device. If the current available memory level of the device on which a picture is to be loaded is normal, a picture which is suitable for the device may be loaded in the web page on the device. Therefore, pictures may be displayed on the device normally, and it may prevent the browser residing in the device from being broken due to low memory situations.

Furthermore, if the current available memory level of the device is low, according to an embodiment of the present disclosure, and if there are already pictures which have been previously normally loaded in a web page on the screen of the device, then optionally, before performing step 450, memories occupied by all loaded pictures of normal size may be released. Subsequently, corresponding small pictures marked as low-memory may be loaded. As a result, all pictures in the web page displayed on the screen of the device are smaller size pictures, i.e., pictures marked as low-memory. In addition, if the current available memory level of the device is normal, then all pictures in the web page displayed on the screen of the device are normal size pictures, that is, pictures marked as normal.

The following pseudo code is an example according to another embodiment of the present disclosure.

```
<picture id="lxx-1">
<source srcset="lxx-large-1.png 2x, lxx-small-1.png low-memory">
</picture>
<picture id="lxx-2">
<source srcset="lxx-large-2.png 2x, lxx-small-2.png low-memory">
</picture>
```

In this example, there are two pictures to be displayed in a web page on a screen of a device, wherein, one picture is 1xx-1, and the other picture is 1xx-2. For each picture, there is only one picture marked as normal, and one picture marked as low-memory. Specifically, as for 1xx-1, when the current available memory level of the device is normal, 1xx-large-1.png may be loaded in the web page on the screen of the device; and when the current available memory level of the device is low, 1xx-small-1.png may be loaded in the web page on the screen of the device, wherein the size of 1xx-large-1.png is 102 KB and the size of 1xx-small-1.png is 52.9 KB. As for 1xx-2, when the current available memory level of the device is normal, 1xx-large-2.png may be loaded in the web page on the screen of the device; and when the current available memory level of the device is low, 1xx-small-2.png may be loaded in the web page on the screen of the device, wherein the size of 1xx-large-2.png is 46.3 KB and the size of 1xx-small-2.png is 18.3 KB. In another embodiment, if 1xx-large-1.png is already loaded, and when 1xx-2 is to be loaded and the current available memory level of the device is determined to be low, then the memory occupied by 1xx-large-1.png is released, and 1xx-small-1.png and 1xx-small-2.png are loaded.

It can be seen from above that when the current available memory level of the device is low, since the small pictures 1xx-small-1.png and/or 1xx-small-2.png are loaded, much memory may be saved and the loading speed may be improved. The browser residing in the device may be prevented from being broken, and the user experiences may be improved.

Figure 5:
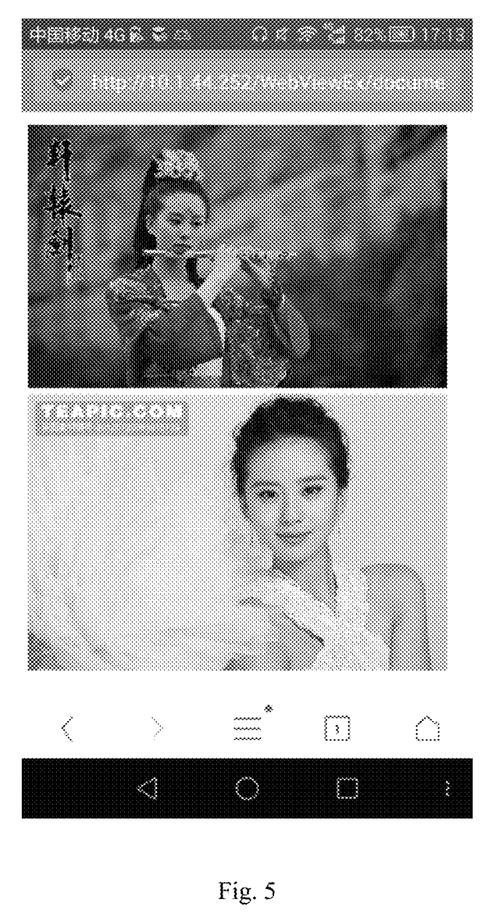
FIG. 5 shows display effects of pictures on a device when the current available memory level of the device is normal by using a method of loading a picture in a web page on a device according to an embodiment of the present disclosure.

FIG. 5 shows display effects of pictures on a device when the current available memory level of the device is normal by using the method of loading a picture in a web page on a device according to an embodiment of the present disclosure.

Figure 6:
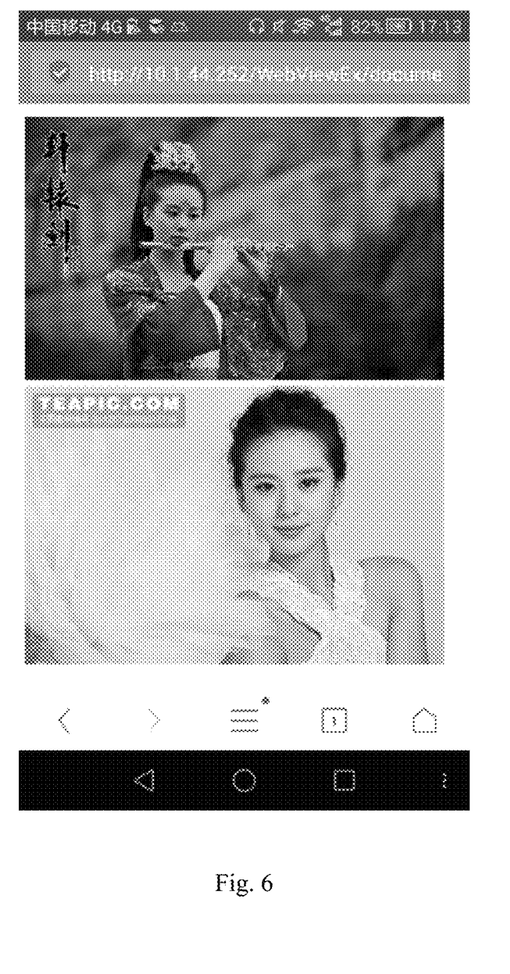
FIG. 6 shows display effects of pictures on a device when the current available memory level of the device is low by using a method of loading a picture in a web page on a device according to an embodiment of the present disclosure.

FIG. 6 shows display effects of pictures on a device when the current available memory level of the device is low by using the method of loading a picture in a web page on a device according to an embodiment of the present disclosure.

In FIG. 5, displayed pictures are 1xx-large-1.png and 1xx-large-2.png. In FIG. 6, displayed pictures are 1xx-small-1.png and 1xx-small-2.png. Referring to FIG. 5 and FIG. 6, it can be seen that, though the display precision of pictures in FIG. 6 is less than that of pictures in FIG. 5, as the pictures in FIG. 6 have been stretched from 1xx-small-1.png and 1xx-small-2.png, the whole displays of pictures are normal, and anomalies such as breaks of browsers are avoided. In addition, lots of memory may be saved as well.

Figure 7:
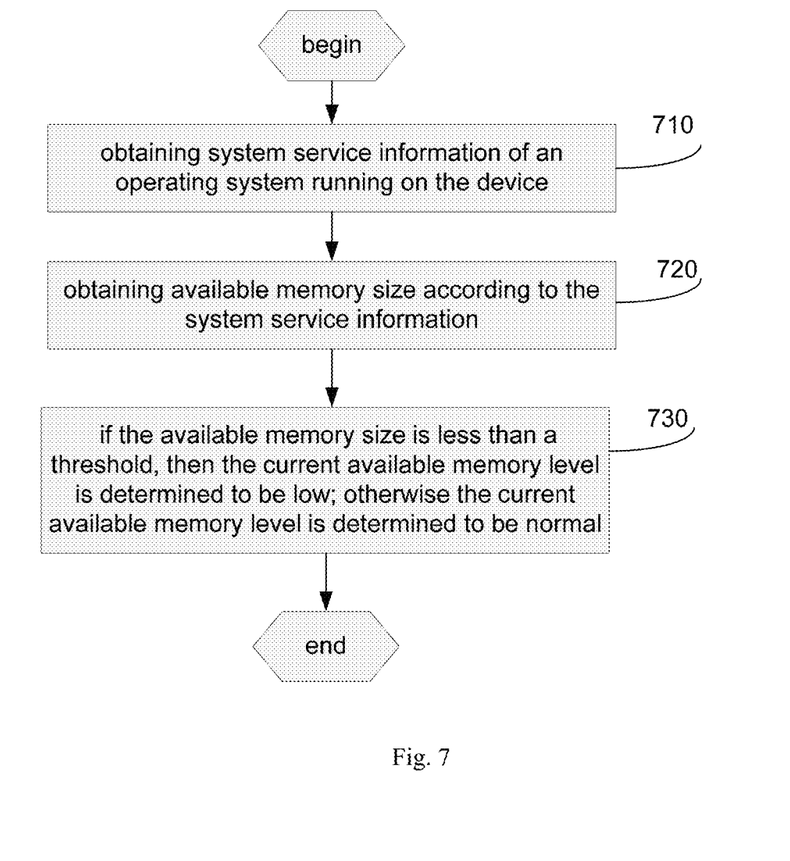
FIG. 7 is a flow chart of a method for determining a current available memory level of a device.

Referring to FIG. 3 again, wherein as for step 310 of determining whether the current available memory level of the device is normal or low, there are many methods in the prior art. FIG. 7 is a flow chart of a method for determining a current available memory level of a device. In FIG. 7, at step 710, the system service information of an operating system which is running on the device is obtained. The system service information may be the context in an Android system, for example. After that, step 720 is performed, i.e., obtaining available memory size according to the system service information. At step 730, if the available memory size is less than a threshold, then the current available memory level is determined to be low; otherwise the current available memory level is determined to be normal. The value of the threshold may be set according to requirements and/or characteristics specific to the device. For example, in one embodiment, the value of the threshold may be set as 5 MB; and in another embodiment, the value of the threshold may be set as 10 MB.

In addition, in the case where the available memory size equals to the threshold such as 5 MB and so on, pictures marked as low-memory may be loaded in web pages on the screen of the device in order to ensure the security of browsers residing in the device, in one embodiment of the present disclosure.

Figure 8:
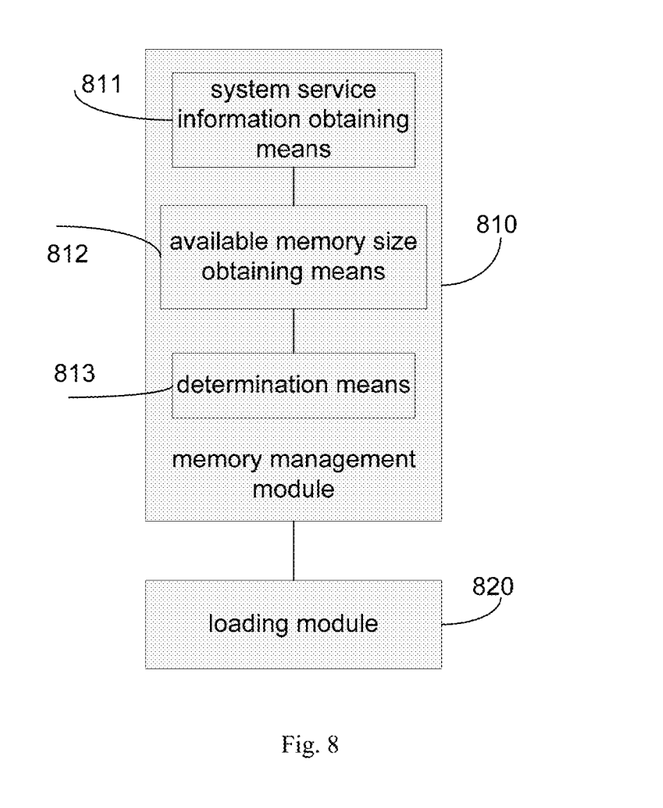
FIG. 8 is a block diagram of an apparatus for loading a resource in a web page on a device according to an embodiment of the present disclosure.

FIG. 8 is a block diagram of an apparatus for loading a resource in a web page on a device according to an embodiment of the present disclosure. In FIG. 8, the apparatus for loading a resource in a web page on a device comprises:

a memory management module 810 configured to determine whether a current available memory level in the device is normal or low;

a loading module 820 configured to load the resource in the web page on the device according to the current available memory level;

wherein, if the current available memory level is low, then the load module 820 loads a specified resource tailored from the resource in the web page on the device.

Further, if the current available memory level is normal, then the loading module 820 may load the resource in the web page on the device according to characteristics of the device.

As described above, the apparatus according to the embodiment of the present disclosure, may load a resource which takes less memory than the resource in the web page if the current available memory level of the device is low. Since the loaded resource takes less memory, much memory may be saved and the loading speed may be improved, therefore the browser residing in the device may be prevent from being broken.

In addition, if the current available memory level of the device is normal, then the apparatus according to the embodiment of the present disclosure will load the resource normally. In other words, the resource may be loaded according to characteristics of the device such as screen resolution. Thus, the loaded resource may be the most suitable to the device.

Further, according to an embodiment of the present disclosure, the loading module 820 is further configured to: release memory taken by a normally loaded resource and reload the specified resource corresponding to the normally loaded resource in the web page on the device if the current available memory level is low and there is the normally loaded resource in the web page.

Specifically, if the current available memory level of the device is low and there are pictures which have been normally loaded in a web page on the screen of the device, then the loading module 820 may release memories occupied by all pictures of normal size and then load respective small pictures. As a result, all pictures in the web page displayed on the screen of the device are smaller size pictures. In addition, if the current available memory level of the device is normal, then all pictures in the web page displayed on the screen of the device are normal size pictures.

According to an embodiment of the present disclosure, the memory management module 810 further comprises:
system service information obtaining means 811 configured to obtain system service information of an operating system running on the device;
available memory size obtaining means 812 configured to obtain available memory size according to the system service information;
determination means 813 configured to: if the available memory size is less than a threshold, then to determine that the current available memory level is low; otherwise to determine that the current available memory level is normal.

According to an embodiment of the present disclosure, the loading module is further configured to obtain information of the specified resource from a header of the picture if the current available memory level is low.

According to an embodiment of the present disclosure, it is provided a computer-readable storage medium on which instructions are stored, wherein, the instructions, when executed by a processor, cause the processor to Implement the method described above.

In addition, according to an embodiment of the present disclosure, instructions stored on the computer-readable storage medium, when executed by the processor, further cause the processor to release memory taken by the loaded resource and reload the specified resource in the web page on the device if the current available memory level is low and there is a loaded resource in the web page.

Further, it should be noted that although in the embodiments described above, the picture is used as an example of the resource to be loaded, the resource is not limited thereto, but may include pictures, audio information or video information and so on. For example, the specified resource may be a compressed video or compressed audio which have a smaller size and require less memory. The information of the video and audio may also be obtained from the header thereof, as known by one skilled in the art.

One skilled in the art may clearly understand that the technologies in the embodiments of the invention may be implemented by the aid of software and necessary universal hardware. Based on such an understanding, the essential part of the technical solutions in the embodiments of the invention, or in other words, the part that contributes to the prior art, may be embodied in the form of a software product that is stored in a storage medium, for example, ROM/RAM, magnetic disc or compact disc, etc., and includes several instructions that can make a computer device (which may be a personal computer, a server or a network device, etc.) implement the methods according to each embodiment of the invention or some part of the embodiments of the invention.

The embodiments in this specification are described in a stepped mode, and each embodiment focuses on the difference from other embodiments; for the same or similar part between each embodiment, reference may be made to each other. Especially, for a system embodiment, because it is basically similar to a method embodiment, the description thereof will be simple, and reference may be made to a part of the illustration of the method embodiment for the related part.

The present invention may, however, be embodied in different forms and should not be construed as limited to the embodiments set forth herein. In this specification, a detailed explanation of known related functions and constitutions may be omitted to avoid unnecessarily obscuring the subject manner of the present invention. In this specification, a singular form may include a plural form as long as it is not specifically mentioned. Furthermore, 'include/comprise' or 'including/comprising' used in the specification represents that one or more components, steps, operations, and elements exist or are added.

The above embodiments of the invention will not limit the protection scope of the invention. All modifications, equivalent substitutions and improvements made within the spirits and principles of the invention will be construed as being within the protection scope of the invention as defined in claims.

What is claimed is:

1. A method of loading a resource in a web page on a device, comprising:
   interpreting an extended syntax in html of the web page, wherein the extended syntax identifies a set of normally loaded resources corresponding to a normal memory level and a specified resource corresponding to a low memory level,
   the specified resource being tailored from the set of normally loaded resources and taking less memory usage than the set of normally loaded resources:
   determining a current available memory level of the device;
   in response to determining that the current available memory level is larger than a threshold:

determining a screen resolution of a screen of the device;
loading a resource from the set of normally loaded resources according to the screen resolution of the device; and
displaying the resource from the set of normally loaded resources in the screen of the device; and
in response to determining that the current available memory level is less than the threshold, loading the specified resource to be entirely displayed in the screen of the device and to consume an entire space of the screen.

2. The method of claim 1, wherein, the resource includes pictures, audio information, or video information.

3. The method of claim 1, wherein, the determining the current available memory level of the device further comprises:
obtaining system service information of an operating system running on the device;
obtaining available memory size according to the system service information;
determining the current available memory level is low when the available memory size is less than the threshold; and
determining the current available memory level is normal when the available memory size is larger than the threshold.

4. The method of claim 1, wherein, in response to determining that the current available memory level is low, the loading the normally loaded resource or the specified resource further comprises: loading the specified resource by obtaining information of the specified resource from a header of the normally loaded resource.

5. The method of claim 1, further comprising:
determining whether the normally loaded resource is loaded on the device;
in response to determining that the normally loaded resource is loaded on the device and that the current available memory level is low, releasing memory taken by the normally loaded resource.

6. The method of claim 1, further comprising:
designing the web page with the extended syntax, the extended syntax comprising:
a first storage path of one or more pictures of the specified resource to be loaded in the web page if the current available memory level is low; and
second and third storage paths of the one or more pictures to be loaded in the web page, respectively, for a smaller screen resolution of the device and for a larger screen resolution of the device, if the current available memory level is normal.

7. An apparatus of loading a resource in a web page on a device, comprising:
one or more hardware processors configured to:
interpret an extended syntax in html of the web page, wherein the extended syntax identifies a set of normally loaded resources corresponding to a normal memory level and a specified resource corresponding to a low memory level,
the specified resource being tailored from the set of normally loaded resources and taking less memory usage than the set of normally loaded resources:
determine a current available memory level of the device;
in response to determining that the current available memory level is larger than a threshold:
determine a screen resolution of a screen of the device;
load a resource from the set of normally loaded resources according to the screen resolution of the device; and
display the resource from the set of normally loaded resources in the screen of the device; and
in response to determining that the current available memory level is less than the threshold, loading the specified resource to be entirely displayed in the screen of the device and to consume an entire space of the screen.

8. The apparatus of claim 7, wherein, the resource includes pictures, audio information or video information.

9. The apparatus of claim 7, wherein, the one or more hardware processors are further configured to:
obtain system service information of an operating system running on the device;
obtain available memory size according to the system service information; and
determine that the current available memory level is low when the available memory size is less than the threshold; and
determine the current available memory level is normal when the available memory size is larger than the threshold.

10. The apparatus of claim 7, wherein, the one or more hardware processors are further configured to obtain information of the specified resource from a header of the normally loaded resource if the current available memory level is low.

11. A non-transitory computer-readable storage medium on which instructions are stored, wherein, the instructions, when executed by a processor, perform a method of loading a resource in a web page on a device, the method including:
interpreting an extended syntax in html of the web page, wherein the extended syntax identifies a set of normally loaded resources corresponding to a normal memory level and a specified resource corresponding to a low memory level,
the specified resource being tailored from the set of normally loaded resources and taking less memory usage than the set of normally loaded resources:
determining a current available memory level of the device;
in response to determining that the current available memory level is larger than a threshold:
determining a screen resolution of a screen of the device;
loading a resource from the set of normally loaded resources according to the screen resolution of the device; and
displaying the resource from the set of normally loaded resources in the screen of the device; and
in response to determining that the current available memory level is less than the threshold, loading the specified resource to be entirely displayed in the screen of the device and to consume an entire space of the screen.

12. The non-transitory computer-readable storage medium of claim 11, wherein, the resource includes pictures, audio information, or video information.

13. The non-transitory computer-readable storage medium of claim 11, wherein, the determining the current available memory level of the device further comprises:
obtaining system service information of an operating system running on the device;
obtaining available memory size according to the system service information;

determining the current available memory level is low when the available memory size is less than the threshold; and determining the current available memory level is normal when the available memory size is larger than the threshold.

* * * * *